7325X
H. Higley,
Cultivator.
Patented Dec. 11. 1832.
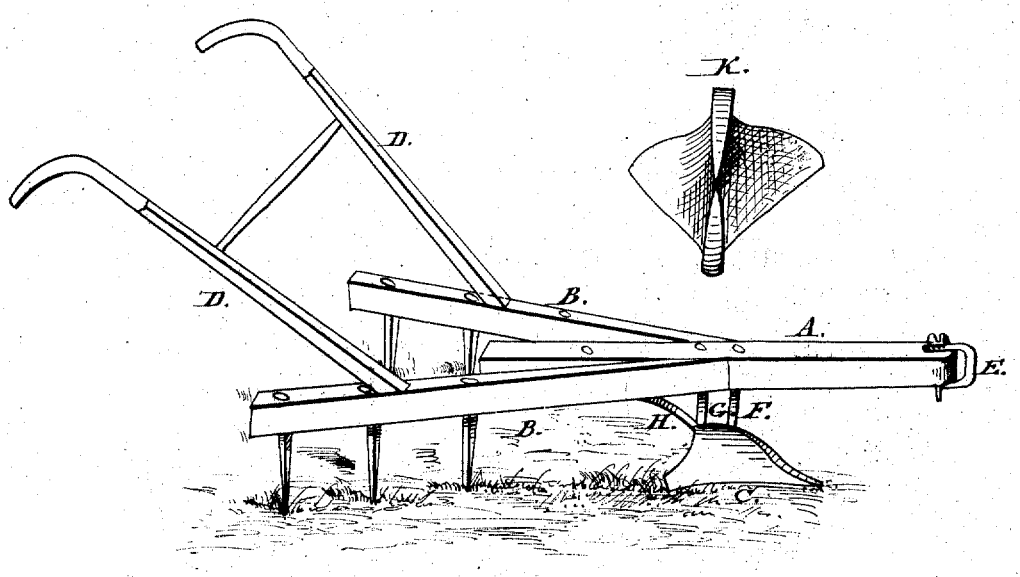

Henry Higley, of Canaan, State of Connecticut,

Letters Patent.

The schedule referred to in these Letters Patent and making part of the same, containing a description in the words of the said Henry Higley himself of his improvement in the plough & harrow To all to whom these Presents shall come Be it known that I Henry Higley of Canaan in the County of Litchfield & State of Connecticut, have invented a new and useful improvement in a machine or instrument called "A Plough & Harrow, to be used for loosening the soil & destroying the weeds among crops of Corn, Cotton, and other Crops, and for other agricultural purposes and that the following is a full and exact description of the construction and operation of the said Machine as invented or improved by me viz — The said Machine or instrument is in its properties a combination of a plough and a harrow and consists of the following parts, — First a straight piece of timber about three inches square and about three feet long (marked A in the annexed plate — Second two straight pieces of timber of the same size and dimensions marked B. which are framed into said first piece on opposite sides of it, at or near its centre at acute angles to it and to each other so that their extreme ends are about two feet and three inches apart, presenting the shape of the common harrow. Into each of said second pieces are inserted three teeth made either of cast or wrought Iron standing perpendicularly and projecting about seven inches from the under side of said pieces of timber, — Into each of said second pieces is also inserted on the upper side a straight piece of timber about three feet long but at the upper end inclining back for a handle (marked D.) and

[illegible]

the handles are connected together by a rod running from one to the other — Under said first piece of timber at or near the place where said second piece join it is placed a share (marked C) which is of the following form and dimensions viz — said share is made of one piece of iron either wrought or cast and is somewhat in the form of a double plough share and its two halves as divided by a line running from the centre of the nose to the centre of the broadest or back end are precisely alike, —— The nose is about three inches long and about one and a half inch wide & is of equal width. The width of the back or broadest end is about thirteen inches. The length from the centre of the broadest end to the extremity of the nose is about thirteen inches from the nose to the extreme corner of the share on each side of the centre edge is straight and the iron is brought to an edge, From this edge on each side it gradually rises towards the centre so that the centre at the back or broadest end is about five inches high — From the nose back it also rises in the centre line before mentioned to the coulter or sword hereafter mentioned.

This centre is also brought to an edge on the upper surface from the point to said coulter which edge also gradually rises from the point to said coulter and from said coulter to the centre of the broadest end is of equal height and is a little flattened both on the under and upper surface, The under surface of said share is hollowing rising gradually from each side and from the nose towards the centre, so that the share is about an inch thick at the centre and gradually grows thinner towards the edge the said share when detached from the instrument presents the appearance shown by the figure in the annexed plate marked K — This share is attached to the harrow already described with the broadest end of the share towards 7325X Dec 11, 1832 the broadest end of the harrow, and the centre line of the
share in a line with said first piece of timber and in the
following manner, A bolt of wrought iron (marked G)
passes thro said first piece of timber just back of where said
second pieces are joined to it and about four inches below the
under side of it is bent forward, at a right angle and pass
under the centre of the share about five inches and a small
bolt passes thro the share and thro this bolt & is fastened with
a nut. A brace to this bolt (Marked H,) made also of
wrought iron passes thro said first piece of timber about
eight inches back of said main bolt, and is joined to it at
the place where it is bent, to pass under the share, about
four inches forward of said main bolt is a coulter or sword
(Marked F,) the upper end of which passes thro said first
piece of timber and is fastened on the top of it with a nut,
and the lower end passes thro the share and thro the end
of said Main bolt, and is fastened on the under side with a
nut, . On the forward end of said first piece of timber
is placed a common, clevis (Marked E,) by which it is to
be drawn, This Machine is to be drawn by one or more
horses or other beasts and to be used for ploughing and harrow
ing among Corn, Cotton and any other crop planted in rows
and for ploughing and harrowing in, wheat and other kinds of
grain and for any other agricultural purpose for which
it can be profitably used, — What I claim as new and as
my own invention or discovery in the machine herein before
described and for the use of which I ask an exclusive pri
vilege, is the share herein before described and the combi
nation of the properties of the plough and the harrow, in the
same instrument and performing the work of both by the same
operation, — Signed at Canaan this 24th day of October AD, 1832, Witnesses William P. Burrall
Wm. M. Burrall Henry Higley 1045 n 8